(12) United States Patent
Yoneda (10) Patent No.: US 8,652,390 B2
(45) Date of Patent: Feb. 18, 2014

(54) SYNTHETIC RESIN CONTAINER MANUFACTURING METHOD

(75) Inventor: Atsushi Yoneda, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 144 days.

(21) Appl. No.: 12/737,474

(22) PCT Filed: Feb. 27, 2009

(86) PCT No.: PCT/JP2009/053662
§ 371 (c)(1),
(2), (4) Date: Jan. 18, 2011

(87) PCT Pub. No.: WO2010/007806
PCT Pub. Date: Jan. 21, 2010

(65) Prior Publication Data
US 2011/0121489 A1 May 26, 2011

(30) Foreign Application Priority Data
Jul. 18, 2008 (JP) ................................ 2008-186883

(51) Int. Cl.
*B29C 59/02* (2006.01)
(52) U.S. Cl.
USPC ........................................................ 264/320
(58) Field of Classification Search
USPC ........................................................ 264/320
See application file for complete search history.

(56) References Cited

U.S. PATENT DOCUMENTS

| | | | |
|---|---|---|---|
| 4,615,928 A | 10/1986 | Kawaguchi et al. | |
| 5,770,130 A * | 6/1998 | Ingram et al. | 264/40.5 |

FOREIGN PATENT DOCUMENTS

| | | |
|---|---|---|
| JP | S42-7076 | 3/1967 |
| JP | S58-192699 | 11/1983 |
| JP | U-S60-166271 | 10/1985 |
| JP | 2000-280248 | 10/2000 |

* cited by examiner

*Primary Examiner* — Larry Thrower
(74) *Attorney, Agent, or Firm* — Manabu Kanesaka

(57) ABSTRACT

In supplying a predetermined amount of a molten resin D between an upper mold 10 and a lower mold 20 for compression molding, after the upper mold 10 is moved downward for a predetermined stroke length so that it approaches the lower mold 20 in which the molten resin D has been supplied, a compression load is applied while moving the lower mold 20 upward and supporting the upper mold 10 such that clamping is conducted against the compression load which has been applied to the lower mold 20. As a result, when molding a molded article in a predetermined shape by compression molding, if molds are allowed to open with a sufficient stroke length for taking a molded article out, prolongation of molding cycle can be effectively prevented, whereby a molded product in a predetermined shape can be mass-produced.

3 Claims, 6 Drawing Sheets

SYNTHETIC RESIN CONTAINER MANUFACTURING METHOD

RELATED APPLICATIONS

The present application is National Phase of International Application No. PCT/JP2009/053662 filed Feb. 27, 2009, and claims priorities from Japanese Application No. 2008-186883 filed Jul. 18, 2008, the disclosure of which is hereby incorporated by reference herein in its entirety.

TECHNICAL FIELD

The present invention relates to a method for manufacturing a synthetic resin container capable of conducting compression molding repeatedly and efficiently even when molds are opened with a sufficient stroke length.

BACKGROUND ART

As disclosed in Patent Document 1, for example, it is known to cut a resin which has been extruded from an extruder in a predetermined amount and supply the resin between a pair of molds, i.e. upper and lower molds, followed by clamping, thereby to allow the resin to compression molded into a predetermined shape.
Patent Document 1: JP-A-2000-280248

DISCLOSURE OF THE INVENTION

Subject to be Solved by the Invention

In order to take out from molds a molded article which has been molded into a predetermined shape by compression molding, it is required to create a space between an upper mold and a lower mold which is necessary for taking out the molded article. Therefore, after the completion of molding, it is desired that molds be opened with a sufficient stroke length.

However, if the stroke length of mold opening is prolonged and opening and closing of molds is repeated with such a long stroke length, the cycle of molding is prolonged, which is unfavorable in respect of molding efficiency.

On the other hand, in order to shorten the cycle of molding, it suffices that opening and closing operation of molds be conducted at a high speed, thereby to reduce the time required for opening and closing of molds.

However, in such compression molding, generally, a compression molding apparatus is used in which a clank mechanism or a hydraulic cylinder is used to conduct mold opening and closing or clamping. In such an apparatus, if an attempt is made to open and close molds at a high speed while retaining its pressurizing capacity so that a high load which is required for compression molding can be obtained, problems may occur that an apparatus is increased in size, running cost is increased, or the like.

Further, it is considered to conduct opening and closing of molds at a high speed by a driving mechanism in which an air cylinder or a ball screw and a servo motor are combined. However, a driving mechanism which is generally used in which an air cylinder or a ball screw and a servo motor are combined has a limit for generating a high load required for compression molding.

The present invention has been made in view of the above-mentioned circumstances, and an object thereof is to provide a compression molding apparatus capable of mass-producing a molded article in a predetermined shape efficiently while effectively avoiding prolongation of the molding cycle even if opening and closing of molds for taking an molded article out is conducted with a sufficient stroke length when molding a molded article in a predetermined shape by compression molding, and a method for manufacturing a synthetic resin container which can preferably utilize such apparatus.

Means for Solving the Subject

The compression molding apparatus according to the present invention has a configuration in which it is provided with a pair of molds, i.e. an upper mold and a lower mold; a lower mold driving means which applies a compression load while moving the lower mold upward during clamping; and an upper mold driving means which supports the upper mold such that clamping is conducted against a compression load applied to the lower mold, after the upper mold is moved downward for a predetermined stroke length.

The method for manufacturing a synthetic resin container according to the present invention is a method in which a molten resin in a predetermined amount is supplied to a pair of molds, i.e., upper and lower molds provided with a cavity corresponding to a desired container shape, followed by compression molding, wherein after the upper mold is moved downward for a predetermined stroke length such that it approaches the lower mold in which the molten resin has been supplied, a compression load is applied to the lower mold while moving the lower mold upward, and the upper mold is supported so that clamping is conducted against a compression load applied to the lower mold.

Advantageous Effects of the Invention

According to the present invention, as mentioned above, compression molding can be repeatedly conducted efficiently, while effectively avoiding prolongation of the molding cycle even if the molds are opened with a sufficient stroke length.

Therefore, according to the method for manufacturing a synthetic resin container of the present invention, a synthetic resin container with a predetermined shape can be produced with a high productivity.

BEST MODE FOR CARRYING OUT THE INVENTION

Preferred embodiments of the invention will be explained with reference to the drawings. [First Embodiment]

First, an explanation is made on the first embodiment of the compression molding apparatus and the method for manufacturing a synthetic resin container according to the present invention.

Figure 1:
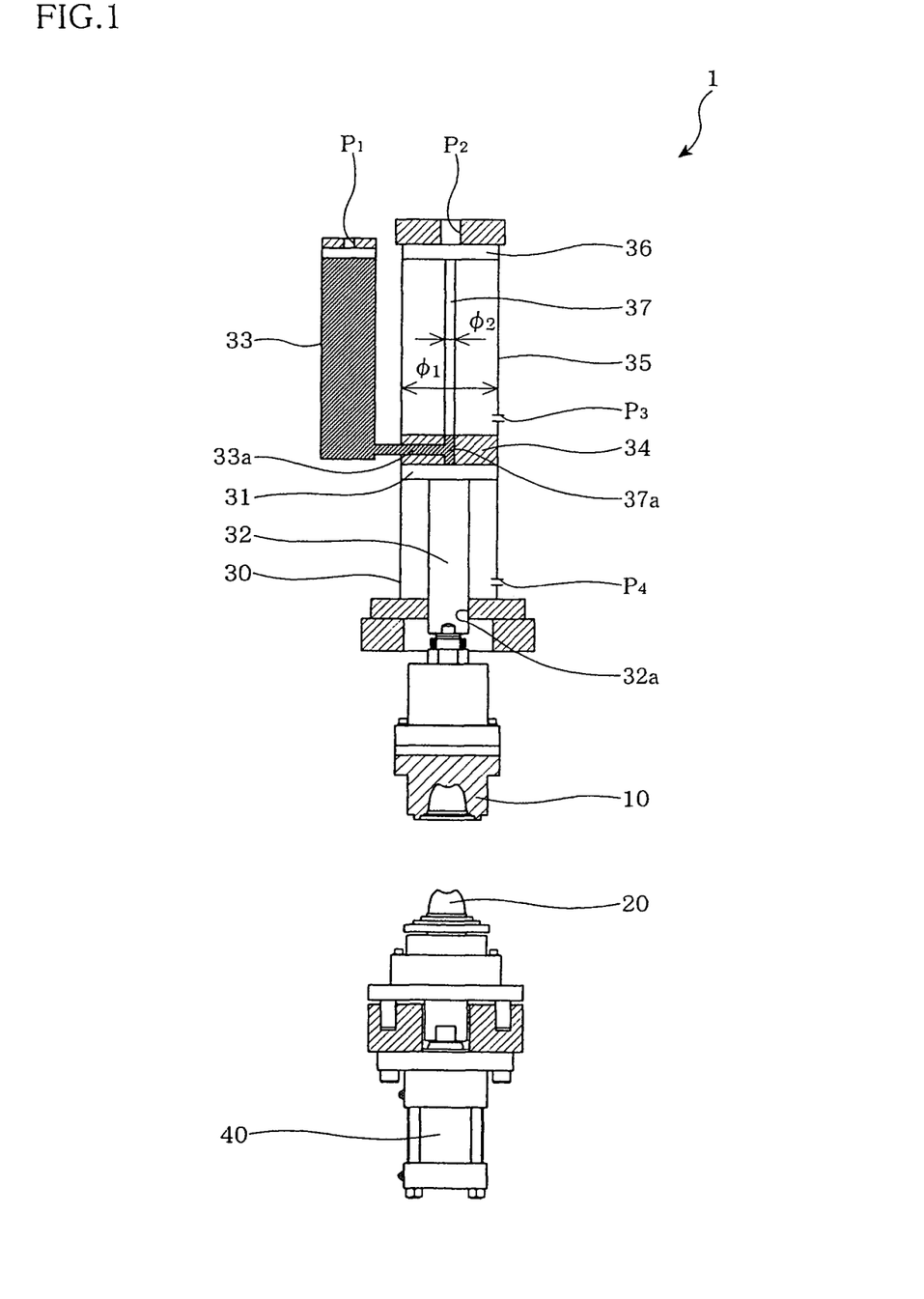
FIG. 1 is a schematic explanatory view of a compression molding apparatus according to the present invention.
Figure 2:
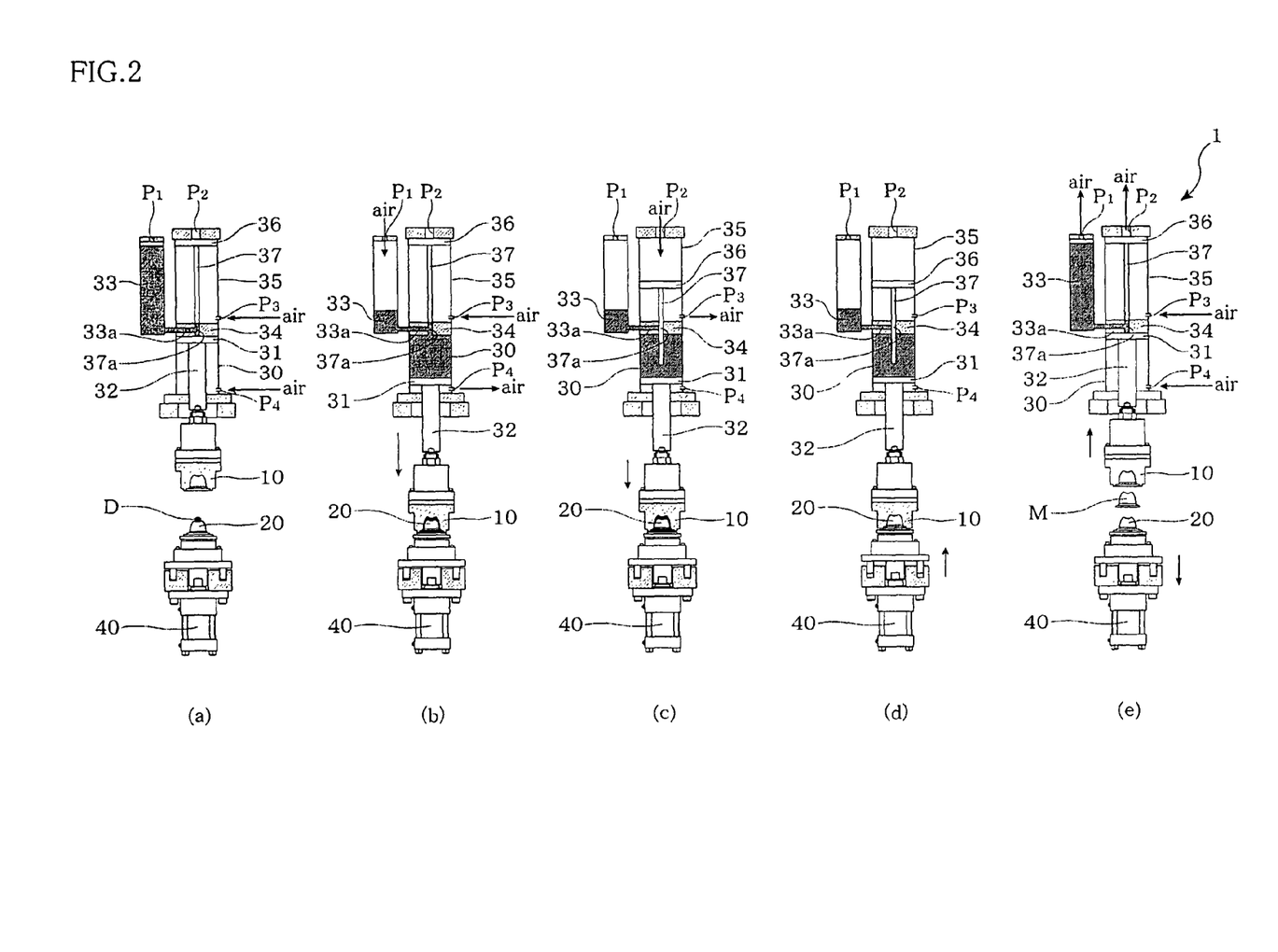
FIG. 2 is a view showing the manufacturing steps for explaining the first embodiment of the method for manufacturing a synthetic resin container according to the present invention.

Here, FIG. 1 is an explanatory view for showing the outline of the compression molding apparatus according to the present invention. FIG. 2 is a view showing the manufacturing steps for explaining the method for manufacturing a synthetic resin container according to the present invention, showing an example in which a synthetic resin container is manufactured by using the compression molding apparatus shown in FIG. 1.

In this embodiment, a compression molding apparatus 1 is provided with a pair of molds, i.e. an upper and a lower mold, that is, an upper mold 10 as a female mold and a lower mold 20 as a male mold. The compression molding apparatus 1 shown in the figures is used for molding a synthetic resin container M in the shape of a thin-wall cup (see FIG. 2(e)), and has a configuration in which a cavity corresponding to the outer shape of the container M is formed between the upper mold 10 and the lower mold 20 which are closed.

The synthetic resin container M can be molded by using an arbitral thermoplastic resin which can be subjected to compression molding. Specific examples thereof include polyester-based resins such as polyethylene terephthalate, polybutylene terephthalate and polyethylene terephthalate, polyolefin-based resins such as polypropylene and polyethylene, polycarbonate, polyarylate, polylactate or a copolymer thereof.

Of such a pair of molds, i.e. the upper and the lower mold, the lower mold 20 is attached to a hydraulic cylinder 40 as a lower driving means. This hydraulic cylinder 40, when clamping is conducted, generates a compression load which is required for compression molding while moving the lower mold 20 upward, and applies the load thus generated to the lower mold 20.

The upper mold 10 is attached to an upper mold driving means which is composed of a first cylinder 30 and a second cylinder 35 which are serially and coaxially connected. By this upper mold driving means, the upper mold 10 is moved downward to approach the lower mold 20 during clamping and is moved upward to remote from the lower mold 20 during mold opening.

The first cylinder 30 has in its inside a first piston 31 and a first piston rod 32 which is connected to the middle of the lower surface of the first piston 31. The upper mold 10 is directly attached to the front end of the first piston rod 32.

The outer diameter of the first piston 31 is formed such that it almost corresponds to the inner diameter of the first cylinder 30. On the outer circumferential surface of the first piston 31, a piston ring (not shown) is provided. Due to the presence of the piston ring, leakage of air or oil is prevented when the first piston 31 reciprocates in the first cylinder 30.

On the bottom surface of the first cylinder 30, a first piston rod insertion hole 32a is provided. The first piston rod 32 is inserted into this first piston rod insertion hole 32a, leads to the outside of the first cylinder 30, thereby allowing the upper mold 10 to be attached thereto. At this time, on the inner circumference surface of the first piston rod insertion hole 32a, leakage of air from the first piston rod insertion hole 32a can be prevented by provision of a sealing element such as an O-ring (not shown).

A second cylinder 35 has in its inside a second piston 36 and a second piston rod 37 connected to the middle of the lower surface of the second piston 36. Prevention of air leakage by allowing the outer diameter of the second piston 36 to approximately correspond to the inner diameter of the second cylinder 35 and by providing a piston ring on the outer circumferential surface of the second piston 36 is the same as that explained for the first cylinder 30.

The first cylinder 30 and the second cylinder 35 are separated by a partition wall 34. In the middle of this partition wall 34, a second piston rod insertion hole 37a is formed. The second piston rod 37 is inserted into this second piston rod insertion hole 37a so that it connects to the inside of the first cylinder 30.

In the partition wall 34, an oil introduction path 33a is formed which leads to an oil tank 33 in which oil is stored. This oil introduction path 33a is intercommunicated with the second piston rod insertion hole 37a, whereby the oil which has been stored in the oil tank 33 can be flown to the first cylinder 30 after passing the oil introduction path 33a and the second piston rod insertion hole 37a.

In each of the upper surface of the oil tank 33, the upper surface of the second cylinder 35, the lower side surface of the second cylinder 35 and the lower side surface of the first cylinder 30, air intake and exhaust ports $P_1$, $P_2$, $P_3$ and $P_4$ are provided. The above-mentioned upper mold driving means enable the upper mold 10 to move upward and downward by conducting air intake and exhaust from these air intake and exhaust ports $P_1$, $P_2$, $P_3$ and $P_4$.

Next, an explanation will be made on the operation of the compression molding apparatus 1 with the above-mentioned configuration. At the same time, an explanation is made on the first embodiment of the method for manufacturing a synthetic resin container which can be preferably implemented utilizing the compression molding apparatus 1 shown in FIG. 1.

At first, a container M which has been molded into a predetermined shape in a previous molding cycle, is taken out. On the lower mold 20 which stands by while keeping the opened state, a molten resin D which has been extruded from an extruder (not shown) and cut into a predetermined resin amount is supplied (see FIG. 2(a)). At this time, the air intake and exhaust ports $P_1$ and $P_2$ are open to the air, and from the air intake and exhaust ports $P_3$ and $P_4$, air is taken in each of the cylinders 30 and 35. The upper mold 10 stands by at a position where a space which is sufficient for taking the container M out is formed between it and the lower mold 20.

Subsequently, after the supply of the molten resin D, while keeping the air intake and exhaust port $P_2$ open to the air and keeping the air intake and exhaust port $P_3$ to the air intake mode, and the air intake and exhaust port $P_1$ is switched to the air intake mode and the air intake and exhaust port $P_4$ is switched to be open to the air. Then, air is taken in the oil tank 33 from the air intake and exhaust port $P_1$, and air in the first cylinder 30 is exhausted from the air intake and exhaust port $P_4$. At the same time, oil in the oil tank 33 is flown into the first cylinder 30 after passing the oil introduction path 33a and the second piston rod insertion hole 37a.

As a result, the first piston 31 is pushed down, and the upper mold 10 which is attached to the first piston rod 32 is moved downward in a direction in which it approaches the lower mold 20 (see FIG. 2(b)).

Here, the speed at which the upper mold 10 is moved downward depends on the amount of air taken from the air intake and exhaust port $P_1$ and the amount of air exhausted from the air intake and exhaust port $P_4$. It is possible to allow the upper mold 10 to move downward with a narrower space than a clank mechanism and at a speed significantly higher than the case in which the molds are opened and closed by means of a hydraulic cylinder. As for the air intake and exhaust from the air intake and exhaust port $P_1$ and the air intake and exhaust port $P_4$, pressure is increased or decreased according to need, thereby to increase or decrease the amount of air taken in and exhausted from the air intake and exhaust port $P_1$ and the air intake and exhaust port $P_4$, thereby to adjust the speed at which the upper mold 10 is moved downward. By increasing the amount of air taken in and exhausted from the air intake and exhaust port $P_1$ and the air intake and exhaust port $P_4$, it is possible to allow the upper mold 10 to move downward at a higher speed.

At any rate, according to this embodiment, the high-speed operation of the upper mold 10 becomes possible. Therefore, if molds are opened with a sufficient stroke length to take the molded container M out, the time required for allowing the upper mold 10 and the lower mold 20 to approach for clamping is reduced, whereby the molding cycle can be shortened.

Although not particularly shown, the oil introduction path 33a may be provided with a pump or an opening and closing valve in the midway thereof, whereby the amount of oil flowing in the oil introduction path 33a can be appropriately adjusted and the operation speed of the upper mold 10 can be adjusted.

At a point where the upper mold 10 is moved downward for a predetermined stroke length, air intake from the air intake and exhaust port $P_3$ is stopped and the air intake and exhaust port $P_3$ is then allowed to be open to the air. At the same time, compressed air which has been pressurized to a predetermined pressure is flown from the air intake and exhaust port $P_2$ into the second cylinder 35. While air of the second cylinder 35 is exhausted from the air intake and exhaust port $P_3$, the second piston 36 is pushed down, whereby the second piston rod 37 is inserted into the first cylinder 30 after passing the second piston rod insertion hole 37a (see FIG. 2(c)).

At this time, the first cylinder 30 is filled with oil. Therefore, when the second piston rod 37 is inserted into the first cylinder 30, a hydraulic pressure is applied to the first piston 31. If the inner diameter of the second cylinder 35 is assumed to be $\phi_1$ and the outer diameter of the second piston rod 37 is assumed to be $\phi_2$, the hydraulic pressure $[P_{oil}]$ acting on the first piston 31 is increased by $\phi_1^2/\phi_2^2$ times $[P_{oil}=(\phi_1^2/\phi_2^2) \times P_{air}]$ based on the pressure $[P_{air}]$ of the compressed air flowing in the second cylinder 35.

As mentioned above, in the upper mold driving means provided in the compression molding apparatus 1 of this embodiment, it is possible to switch from low-pressure driving to high-pressure driving by appropriately opening and closing air intake and exhaust ports $P_1$, $P_2$, $P_3$ and $P_4$. Then, the upper mold driving means which has been switched to high-pressure driving serves as a pressure-increasing means, and increases a load applied to the upper mold 10.

During clamping, when the upper mold 10 moves downward for a predetermined stroke length, the upper mold driving means is switched to the high-pressure driving, thereby to allow the load applied to the upper mold 10 to be increased. On the other hand, simultaneously with or after switching the upper mold driving means to high-pressure driving, the hydraulic cylinder 40 to which the lower mold 20 has been attached is driven, a load which is required to compression molding is applied to the lower mold 20 while moving the lower mold 20 to move upward (see FIG. 2(d)).

At this time, a load applied to the upper mold 10 is increased such that it exceeds a compression load applied to the lower mold 20. As a result, the upper mold 10 is supported by the upper mold driving means such that clamping is conducted against a compression load applied to the lower mold 20, whereby the molten resin D is compression-molded into a container M with a predetermined shape in the cavity between the upper mold 10 and the lower mold 20.

After compression molding is completed, the upper mold 10 is moved upward to open the mold in order to take the molded container M out (see FIG. 2(e)).

In order to open the molds, by allowing air to be exhausted from the air intake and exhaust port $P_2$ while allowing air to be intaken from the air intake and exhaust port $P_3$ to the second cylinder 35, thereby to allow the second piston 36 to be pushed up. At the same time, by allowing air to be exhausted from the air exhaust port $P_1$ which is open to the air, while allowing air to be taken in from the air intake and exhaust port $P_4$ to the first cylinder 30, the oil in the first cylinder 30 is returned to the oil tank 33, thereby to push up the first piston 31. As a result, the upper mold 10 is moved upward in such a manner that it is separated from the lower mold 20.

During the mold opening, the lower mold 20 is moved downward to a stand-by position by driving the lower mold driving means.

After the molds are opened and the container M is taken out, the compression molding apparatus is returned to the state shown in FIG. 2(a) to repeat compression molding.

In this embodiment in which compression molding is conducted in the above-mentioned way, the upper mold driving means which is provided in the compression molding apparatus 1 enables high-speed operation of the upper mold 10, and can apply a necessary load to the upper mold 10 by switching to high-pressure driving. Therefore, even if the molds are opened with a sufficient stroke length to take a molded article out, the molding cycle is effectively prevented from being prolonged, a compression molding is repeated efficiently, whereby the synthetic resin container M in a predetermined shape can be mass-produced with a high productivity.

Further, in this embodiment, there are advantages that, when the upper mold driving means is switched to high-pressure driving to increase a load to be applied to the upper mold 10, by appropriately adjusting the timing or degree of increase, the fine adjustment of the clamping pressure can be conducted taking into consideration the balance with the compression load applied to the lower mold 20.

When the upper mold 10 is moved downward for a predetermined stroke length, a load applied to the upper mold 10 is increased and, at the same time, the lower mold 20 is moved upward, thereby to enable clamping while allowing the upper mold 10 and the lower mold 20 to approach each other. As a result, after the upper mold 10 is moved downward for a predetermined stroke length for a short period of time, the time required for allowing the molten resin M to be molded into the synthetic resin container M in a predetermined shape can also be reduced. This will be explained in detail in the third embodiment, given later. [Second Embodiment]

Next, the second embodiment of a compression molding apparatus and the method for manufacturing a synthetic resin container according to the present invention will be explained.

Figure 3:
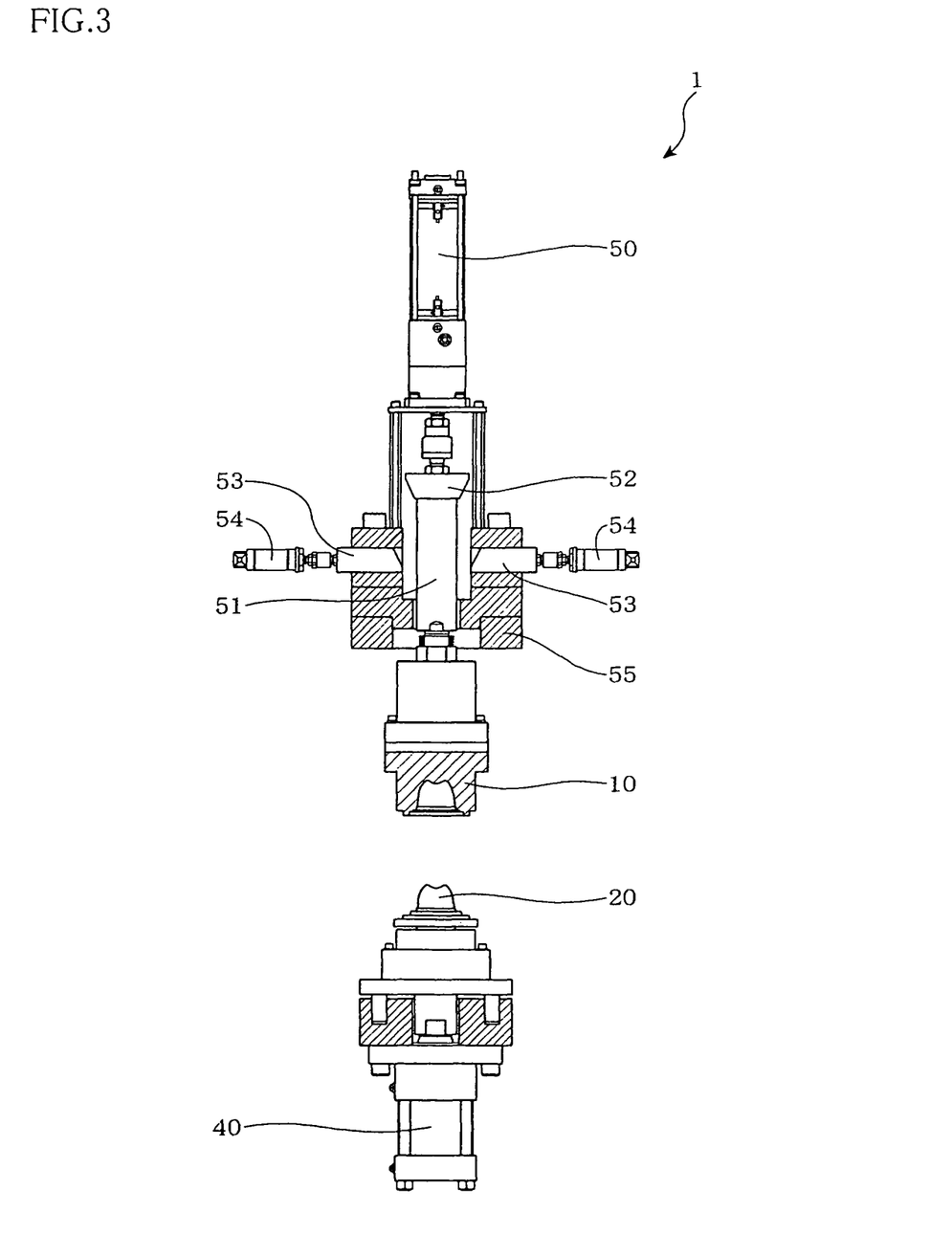
FIG. 3 is a schematic explanatory view showing the second embodiment of the compression molding apparatus according to the present invention.
Figure 4:
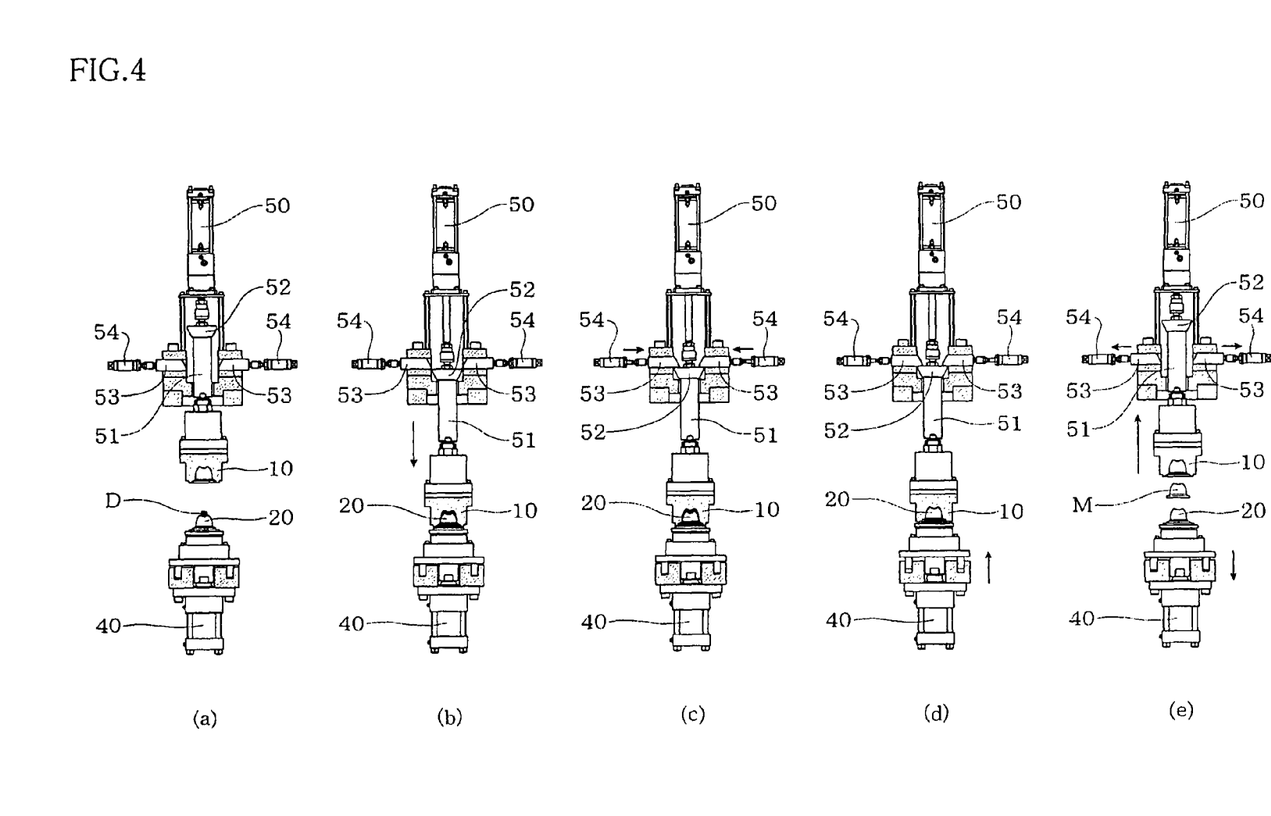
FIG. 4 is a view showing the manufacturing steps for explaining the second embodiment of the method for manufacturing the synthetic resin container according to the present invention.

Here, FIG. 3 is an explanatory view for showing the outline of the compression molding apparatus according to this embodiment. Further, FIG. 4 is a view for showing the manufacturing steps for explaining the method for manufacturing a synthetic resin container according to this embodiment, and shows an example in which a synthetic resin container is manufactured by using the compression molding apparatus shown in FIG. 3.

The compression molding apparatus 1 in this embodiment is provided with a pair of molds, i.e. the upper mold 10 and the lower mold 20, as in the case of those shown in the above-mentioned first embodiment. Provision of the lower mold 20 to the hydraulic cylinder 40 as the lower driving means is the same as in the above-mentioned first embodiment, and hence, a detailed explanation thereof is omitted.

In this embodiment, the upper mold 10 is attached to an air cylinder 50 as the upper mold driving means. This embodiment differs from the above-mentioned first embodiment in this point.

An air cylinder 50 is mounted vertically relative to the base table 55. To the front end side of an output axis 51 of the air cylinder 50, the upper mold 10 is attached. When the air cylinder 50 is driven, the upper mold 10 is moved up and down such that it remotes from the lower mold 20, thereby enabling high-speed operation of the upper mold 10.

After the upper mold 10 is moved downward for a predetermined stroke length, the hydraulic cylinder 40 to which the lower mold 20 has been attached is driven, a load necessary for compression molding is applied to the lower mold 20 while moving the lower mold 20 upward. At this time, in order to support the upper mold 10 so that clamping is conducted against a compression load applied to the lower mold 20, the upper mold driving means has a fixing means to prevent the upward movement of the upper mold 10.

In the compression molding apparatus 1 shown in FIG. 3, engagement bars 53 which are engaged with engagement tables 52 provided on the base part side of an output axis 51 and serve to suppress the upward movement of the upper mold 10 are provided on the left and right of the base table 55 as fixing means such that they are opposed to each other. The engagement bar 53 is provided such that it can move forward and backward in the horizontal direction by means of an air cylinder 54. The engagement bars 53 move forward when the upper mold 10 is moved downward for a predetermined stroke length, and when the engagement bars 53 are engaged with the upper surface side of the engagement table 52, the engagement bars 53 serve to suppress the upward movement of the upper mold 10 (see FIG. 4(c)).

Subsequently, operation of the compression molding apparatus 1 with the above-mentioned configuration will be explained. At the same time, the second embodiment of the method for manufacturing a synthetic resin container according to the present invention which can be preferably implemented by using the compression molding apparatus 1 shown in FIG. 3 will be explained.

As in the same manner as the above-mentioned first embodiment, at first, the molten resin D is supplied to the lower mold 20 (see FIG. 4(a)). Subsequently, the air cylinder 50 as the upper mold driving means is driven to allow the upper mold 10 to move downward (see FIG. 4(b)).

Subsequently, when the upper mold 10 is moved downward for a predetermined stroke length, the air cylinder 54 is driven to allow the engagement bar 53 to move forward. As a result, the engagement bar 53 is engaged with the upper surface of the engagement table 52 provided on the base part of the output axis 51, whereby the upward movement of the upper mold 10 is suppressed (see FIG. 4(c)).

On the other hand, while allowing the lower mold 20 to move upward by driving the hydraulic cylinder 40 to which the lower mold 20 has been attached, a load necessary for compression molding is applied to the lower mold 20 (see FIG. 4(d)).

As a result, in order to attain clamping against the compression load which has been applied to the lower mold 20, the upper mold 10 is supported by the upper driving means, whereby the molten resin D is compression-molded into the container M in a predetermined shape in a cavity formed between the upper mold 10 and the lower mold 20.

When the compression molding is completed, the air cylinder 54 is driven to allow the engagement bar 53 to move backward, thereby to cancel the engagement of the engagement bar 53 with the engagement table 52. Subsequently, the air cylinder 50 is driven to allow the upper mold 10 to move upward to conduct mold opening, whereby the molded container M is taken out (see FIG. 4(e)).

Further, in mold opening, the lower mold 20 is also moved downward to the stand-by position by driving the lower driving means.

If the molds are opened and the container M is taken out, the compression molding apparatus is returned to the state shown in FIG. 4(a), and compression molding is repeated.

In this embodiment in which compression molding is conducted as mentioned above, the air cylinder 50 as the upper mold driving means which is provided in the compression molding apparatus 1 enables high-speed operation of the upper mold 10. Then, when the upper mold 10 is moved downward for a predetermined stroke length, the upper mold 10 is prevented from moving upward by the fixing means, whereby clamping is conducted against a compression load applied to the lower mold 20.

Therefore, if an attempt is made to allow the molds to open with a sufficient stroke length in order to take a molded article out, prolongation of the molding cycle can be effectively prevented, compression molding can be repeatedly conducted efficiently, whereby the synthetic resin container M in a predetermined shape can be mass-produced with a high productivity. [Third Embodiment]

The third embodiment of the compression molding apparatus and the method for manufacturing a synthetic resin container according to the present invention will be explained.

Figure 5:
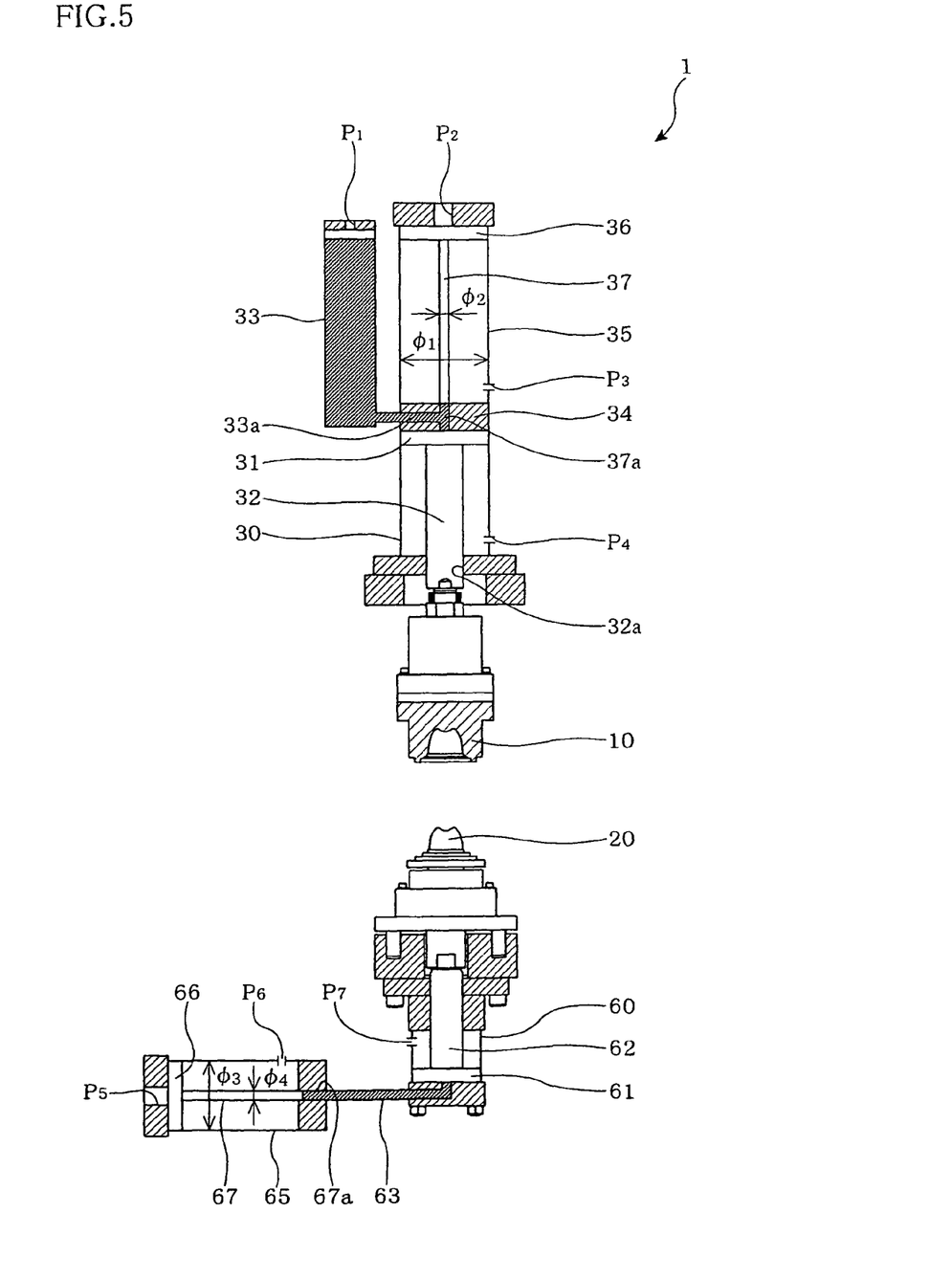
FIG. 5 is a schematic explanatory view showing the third embodiment of the compression molding apparatus according to the present invention.
Figure 6:
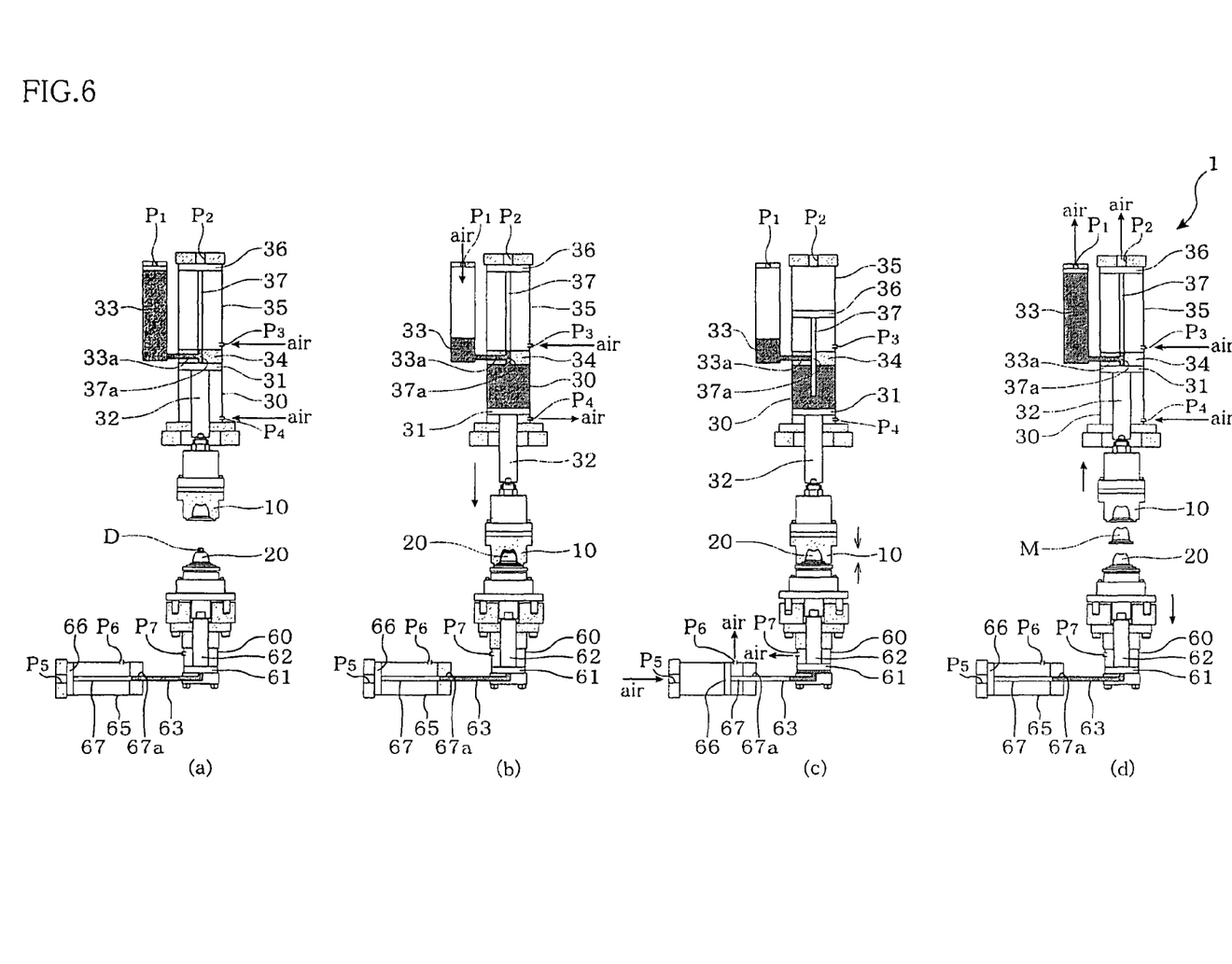
FIG. 6 is a view showing the manufacturing steps for explaining the third embodiment of the method for manufacturing the synthetic resin container according to the present invention.

Here, FIG. 5 is an explanatory view showing the outline of the compression molding apparatus according to this embodiment. FIG. 6 is a view showing the manufacturing steps for explaining the method for manufacturing a synthetic resin container according to this embodiment, and shows an example in which a synthetic resin container is manufactured by using the compression molding apparatus shown in FIG. 5.

The compression molding apparatus 1 in this embodiment is provided with a pair of molds, i.e. the upper mold 10 and the lower mold 20, as in the case of those shown in the above-mentioned first embodiment. As in the first embodiment, the upper mold 10 is attached to the upper mold driving means which is composed of the first cylinder 30 and the second cylinder 35 which are coaxially and serially connected. In this embodiment, the lower driving means is different from that in the first embodiment.

The lower mold driving means of this embodiment is provided with a first cylinder 60 and a second cylinder 65 which is connected to this first cylinder 60 through an oil introduction path 63.

The first cylinder 60 has in its inside a first piston 61 and a first piston rod 62. The lower mold 20 is attached to the front end side of the first piston rod 62. On the other hand, the second cylinder 65 has in its inside a second piston 66 and a second piston rod 67. The second piston rod 67 is inserted into a second piston rod insertion hole 67a which is provided in the second cylinder 65. When the second piston rod 67 moves in the right direction in the figure, the oil stored in the oil introduction path 63 is pressurized to flow in the first cylinder 60.

The second cylinder 65 is provided with the air intake and exhaust ports $P_5$ and $P_6$ and the first cylinder 60 is provided with the air intake port $P_7$, as shown in the figure. The lower mold driving means of this embodiment enables the lower mold 20 to move upward and downward by taking in and exhausting air from these air intake and exhaust ports $P_5$, $P_6$ and $P_7$.

That is, when compressed air which has been pressurized to a predetermine pressure is flown to the second cylinder 65 from the air intake and exhaust port $P_5$ of the second cylinder 65, the second piston 66 is moved while air in the second cylinder 65 is exhausted from the air intake and exhaust port $P_6$. As a result, oil stored in the oil introduction path 63 is pressurized by the second piston rod 67 and flown to the first cylinder 60. Due to the hydraulic pressure acted at this time, air in the first cylinder 60 is then exhausted from the air intake and exhaust port $P_7$, and the first piston 61 is pushed up, and the lower mold 20 attached to the first piston rod 62 is moved upward. Then, by allowing the air intake exhaust port $P_5$ to be open to the air and by allowing compressed air to be flown from the air intake and exhaust port $P_6$ to the second cylinder 65, the lower mold 20 can be moved downward due to the operation reverse to that mentioned above.

The pressure of the compressed air $[P_{air}]$ flown into the second cylinder 65 and the hydraulic pressure $[P_{oil}]$ acting on the first piston 61 satisfies the relationship $P_{oil} = (\phi_3^2/\phi_4^2) \times P_{air}$, assuming that the inner diameter of the second cylinder 65 is $\phi_3$ and the outer diameter of the second piston rod 67 is $\phi_4$.

Next, operation of the compression molding apparatus 1 with the above-mentioned configuration will be explained, and the third embodiment of the method for manufacturing a synthetic resin container according to the present invention which can be preferably implemented by using the compression molding apparatus 1 shown in FIG. 5 will be explained.

The compression molding apparatus 1 of this embodiment shown in FIG. 5 is provided with the upper driving means which is the same as that of the first embodiment. The third embodiment differs from the first embodiment only in the lower driving means. Therefore, although it is possible to implement the method for manufacturing a synthetic resin container according to the first embodiment, in this embodiment, an explanation is made on an embodiment in which when the upper mold 10 is moved downward for a predetermined stroke length, the lower mold 20 is moved upward while increasing a load applied to the upper mold 10, whereby clamping is conducted while the upper mold 10 and the lower mold 20 are close to each other.

In this embodiment, at first, the molten resin D is supplied to the lower mold 20 (see FIG. 6(a)), and then the upper mold 10 is moved downward for a predetermined stroke length (see FIG. 6(b)). When the upper mold 10 is moved downward for a predetermined stroke length, the upper driving means is switched to high-pressure driving, whereby a load applied on the upper mold 10 is increased. The above-mentioned operation is completely the same as that in the first embodiment.

In this embodiment, simultaneously with or almost simultaneously with an increase in the load applied on the upper load 10, the lower mold 20 is moved upward by the lower driving means, thereby allowing clamping to be conducted with the upper mold 10 and the lower mold 20 being close to each other (see FIG. 6(c)).

In this way, in the final stage of compression molding to mold the molten resin D into a container with a thin-wall cup shape where the largest load is required, it is possible to apply a sufficient load to the molten resin D, and the time required for compression molding can be shortened by allowing clamping to be conducted with the upper mold 10 and the lower mold 20 being close to each other. The molten resin D starts to solidify by heat dissipation when it is supplied to the lower mold 20. Therefore, in respect of reduction in molding cycle time but also improvement in moldability, it is extremely effective to complete compression molding as shortly as possible when the molten resin D can be easily subjected to deformation by plasticization.

When clamping is conducted with the upper mold 10 and the lower mold 20 being close to each other, the molten resin D is subjected to compression molding into the container M within a cavity formed between the upper mold 10 and the lower mold 20. When compression molding is completed, in order to take the container M out, molds are opened by moving the upper mold 10 upward (see FIG. 6(d)). When the molds are opened and the container M is taken out, the compression molding apparatus is returned to the state shown in FIG. 6(a) to repeat compression molding.

Hereinabove, the present invention is explained with reference to preferred embodiments. The present invention is not limited to the above-mentioned embodiment, and it is needless to say various modifications are possible within the scope of the present invention.

For example, in the above-mentioned first embodiment and the second embodiment, the type of the upper mold driving means is not limited to that mentioned above as far as the upper mold 10 can be supported such that clamping can be conducted against a compression load which has been applied to the lower mold 20.

That is, in the first embodiment and the second embodiment, a compression load required for compression molding is generated by the lower driving means, and is applied to the lower mold 20. Therefore, the upper mold driving means is not required to have pressurizing capacity to allow such a high load to be generated. Therefore, as for the upper driving means, means with various mechanisms capable of moving the upper mold 10 upward and downward at a high speed can be used as long as it satisfies the requirement that the upper mold 10 can be supported such that clamping is conducted against a compression load applied to the lower mold 20.

In the above-mentioned third embodiment, a lower mold driving means different from that in the first and second embodiments is used. However, as far as the time required for compression molding can be reduced by allowing, after the upper mold 10 to move downward at a high speed for a predetermined stroke length, clamping to be conducted with the upper mold 10 and the lower mold 20 being close to each other, the same hydraulic cylinder 40 as that in the first and second embodiments can be used.

In the above-mentioned embodiment, the upper mold 10 is used as a female mold and the lower mold 20 is used as a male mold. The molds are not limited thereto, and the upper mold 10 may be used as a male mold and the lower mold 20 may be used as a female mold.

INDUSTRIAL APPLICABILITY

The present invention can be used particularly preferably in the production of a synthetic resin container by compression molding.

The invention claimed is:

1. A method for manufacturing a synthetic resin container in which a molten resin in a predetermined amount is supplied to a pair of molds including an upper mold and a lower mold provided with a cavity corresponding to a desired container shape, followed by compression molding by a compression molding apparatus comprising a lower mold driving unit which applies a compression load to the lower mold while moving the lower mold upward during clamping, and an upper mold driving unit which is switchable between a low-pressure driving lowering the upper mold to a predetermined stroke length and a high-pressure driving applying to the upper mold a load higher than the compression load which is applied to the lower mold, wherein after the upper mold is moved downward for the predetermined stroke length such that the upper mold approaches the lower mold in which the molten resin has been supplied, the compression load is applied to the lower mold while moving the lower mold upward by driving the lower mold driving unit simultaneously with or after switching the upper mold driving unit from the low-pressure driving to the high-pressure driving.

2. The method for manufacturing a synthetic resin container according to claim 1, wherein, when the upper mold is moved downward for the predetermined stroke length, the upper mold is changed from the low-pressure driving to the high-pressure driving, and the lower mold is moved upward to close to each other to conduct clamping.

3. The method for manufacturing a synthetic resin container according to claim 1, wherein a speed of movement of the upper mold is faster than a speed of movement of the lower mold.

* * * * *